(12) United States Patent
Alsayegh et al.

(10) Patent No.: US 11,866,610 B2
(45) Date of Patent: Jan. 9, 2024

(54) TABLET-BASED METHOD OF PRODUCING NANO/MICRO PARTICLE WATER SUSPENSIONS AND CARBON DIOXIDE GAS (71) Applicant: KUWAIT INSTITUTE FOR SCIENTIFIC RESEARCH, Safat (KW)

(72) Inventors: Naser Alsayegh, Safat (KW); Husain Bahzad, Safat (KW); Nawaf F. Aljuwahel, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/588,411

(22) Filed: Jan. 31, 2022

(65) Prior Publication Data
US 2023/0242770 A1    Aug. 3, 2023

(51) Int. Cl.
C09D 5/02       (2006.01)
C23C 18/42      (2006.01)
C09D 7/61       (2018.01)
C09D 1/00       (2006.01)

(52) U.S. Cl.
CPC ............... C09D 5/02 (2013.01); C09D 1/00 (2013.01); C09D 7/61 (2018.01); C23C 18/42 (2013.01)

(58) Field of Classification Search
CPC .... C09D 5/02; C09D 7/61; C09D 1/00; C23C 18/42
See application file for complete search history.

(56) References Cited

U.S. PATENT DOCUMENTS

| 10,035,112 B2 | 7/2018 | Barcikowski et al. |
| 10,184,025 B2 | 1/2019 | Ichikawa et al. |
| 2005/0118279 A1* | 6/2005 | Blotsky ............... A61K 9/0007 424/617 |
| 2017/0199185 A1 | 7/2017 | Miyazawa et al. |

(Continued)

FOREIGN PATENT DOCUMENTS

| CN | 106350328 A | * | 1/2017 |
| CN | 106883829 | | 6/2017 |

(Continued)

OTHER PUBLICATIONS

Ipci et al. "Effervescent tablets: a safe and practical delivery system for drug administration" ENT Updates 2016;6(1):46-50. (Year: 2016).*

(Continued)

Primary Examiner — Robert S Walters, Jr.
(74) Attorney, Agent, or Firm — Nath, Goldberg & Meyer; Richard C. Litman (57) ABSTRACT A tablet-based method for fabricating a suspension including gold (Au) particles and water can include adding to water a solid tablet prepared from a solid alkaline powder, a solid acid powder, and gold particles. Carbon dioxide ($CO_2$) gas can be generated once the tablet is added to the water. The gold (Au) particles can be in microparticle or nanoparticle form. The solid alkaline powder can include sodium bicarbonate ($NaHCO_3$) or sodium carbonate ($Na_2CO_3$). The solid acid powder can include monosodium phosphate ($NaH_2PO_4$).

16 Claims, 6 Drawing Sheets

(56) References Cited

U.S. PATENT DOCUMENTS

2019/0127632 A1    5/2019    Aziz et al.

FOREIGN PATENT DOCUMENTS

| | | |
|---|---|---|
| CN | 108129002 | 6/2018 |
| FR | 2 639 266 | 5/1990 |

OTHER PUBLICATIONS

Kim "Compressed donut-shaped tablets with zero-order release kinetics" Pharm Res. Jul. 12, 1995(7) 1045-1048. Abstract provided.*

Antioxidants accessed at https://www.chm.bris.ac.uk/webprojects2001/anderson/antioxidants.htm available online at least as early as Feb. 2021.*

Naser Ali et al., "A Review on Nanofluids: Fabrication, Stability, and Thermophysical Properties," Journal of Nanomaterials, vol. 2018, 33 pages, Jun. 4, 2018.

Naser Ali et al., "New pH Correlations for Stainless Steel 316L, Alumina, and Copper(I) Oxide Nanofluids Fabricated at Controlled Sonication Temperatures," Journal of Nano Research, vol. 58, pp. 125-138, Jun. 2019.

Naser Ali et al., "Aluminium Nanofluids Stability: A Comparison between the Conventional Two-Step Fabrication Approach and the Controlled Sonication Bath Temperature Method," Journal of Nanomaterials, vol. 2019, 9 pages, Oct. 27, 2019.

Almurtaji et al., "On the Role of Nanofluids in Thermal-hydraulic Performance of Heat Exchangers—A Review," Nanomaterials (Basel), 10(4): 734, Apr. 11, 2020.

* cited by examiner

TABLET-BASED METHOD OF PRODUCING NANO/MICRO PARTICLE WATER SUSPENSIONS AND CARBON DIOXIDE GAS

BACKGROUND

1. Field

The disclosure of the present patent application relates to suspensions, and particularly, to a tablet-based method of producing gold nano/micro-particle/pure water suspensions and carbon dioxide ($CO_2$) gas.

2. Description of the Related Art

Suspensions are fluids that contain dispersed solid particles. These particles usually have a size ranging from nanometers (nm) to micrometers ($\mu$m). Such suspensions include a hosting liquid (i.e., the "base fluid") with suspended solid particles on the order of micrometers or nanometers, resulting in so-called "microfluids" and "nanofluids", respectively. The thermal conductivity of the particles is at least an order of magnitude higher than the base fluid. As such, dispersing the particles in the base fluid causes the overall (or "effective") thermal conductivity of the suspension to significantly increase.

Micro/nanofluids are generally useful for heat transfer applications (e.g., heat exchangers working fluids); medical or inner body diagnostic fluid applications (e.g., radioactive technetium imaging); petroleum-related applications (e.g., to improve fuel product combustion efficiency or enhance the crude oil recovery at the flooding stage); and as lubricants for mechanical parts.

In order for the suspension to reach optimal effective thermal conductivity, the particles must be homogenously dispersed in the base fluid and must be maintained in a physically stable condition. Meeting both requirements can be challenging and there are a limited number of routes for the production of such suspensions. Primarily, either a one-step or a two-step approach may be used. In the one-step method, the particles are formed and dispersed in a single procedure, whereas in the two-step method, a dry powder is added to a base fluid, after which the particles and base fluid are mixed together using a dispersion device (e.g., an ultrasonicator, a homogenizer, a magnetic stirring or ball milling device).

The one-step approach may result in a suspension having a higher dispersion physical stability and avoids the need to start with a dry powder, which can be difficult to handle and disperse, and must be both transported and stored. Despite these advantages, the one-step method also results in the production of unwanted residues due to incomplete reactions and is only available for a limited number of particle-base fluid combinations. For example, the one-step method cannot be used to produce a diamond-water suspension since pure micro-diamonds and nano-diamonds can only be produced through chemical processes in the dry form.

On the other hand, the two-step method involves use of pre-prepared powders which are added to any non-dissolving base fluid and dispersed in the non-dissolving base fluid with a mixing device, such as an ultra-sonicator, homogenizer, magnetic stirrer, or high energy ball (or rod) mill. Any type of suspension can be manufactured using this approach. In addition, users with a minimum level of experience can perform this method as the powders are commercially available on a wide scale and can be used for both small- and large-scale production. Nevertheless, the downside of the two-step approach of suspension production is that the resulting mixture occasionally has a lesser level of dispersion physical stability than the one-step method. This can be improved to a certain extent, however, by including surfactants with the mixture at the fabrication stage or by employing surface functionalization to particles.

The two-step method has the advantage that any combination of particles and non-dissolving base fluids can be used to produce the suspensions. Further, two-step methods are, in general, easier to perform and can be used for either mass or small size production. Additionally, the dry powders are typically widely commercially available. Due to these advantages, the two-step method is widely used by researchers in the field of advanced fluids. However, suspensions made by the two-step method have lower levels of dispersion physical stability than those created by the one-step method, although this can be improved through the addition of surfactants in the mixture at the fabrication stage, or by conducting surface functionalization on the particles.

Quenching can improve the mechanical properties of a prepared metal or metallic part. Conventionally, quenching is done by initially heating a metal to its solution treatment temperature, homogenizing the heated alloy through soaking, and then exposing the metallic part to an appropriate heat transfer media (also known as a quenchant) to cool it down. The common cooling media in a conventional quenching process includes water and oil as these types of liquids are widely available, easy to handle, and of low cost. However, some disadvantages of using water alone as a quenching liquid include lack of wettability, high air pockets formation on the quenched metal exposed surface, and uneven heat transfer distribution along the quenched part, which results in an uneven size expansion to the final product. Some disadvantages of using oil are that different types and concentrations of chemical additives are required to remove the undesired residuals of the final product surface, that additives are required to provide anti-oxidation to the quenched metal, and that thermal stabilizers are required for even heat transfer mechanism along the quenched part.

Thus, a method for fabricating suspensions, solving the aforementioned problems is desired.

SUMMARY

A method for fabricating a suspension including gold (Au) particles and $CO_2$ gas can include adding to water a solid tablet prepared from a solid alkaline powder, a solid acid powder, and gold particles. Carbon dioxide ($CO_2$) gas can be generated once the tablet is added to the water. The gold (Au) particles can be in microparticle or nanoparticle form. The solid alkaline powder can include sodium bicarbonate ($NaHCO_3$) or sodium carbonate ($Na_2CO_3$). The solid acid powder can include monosodium phosphate ($NaH_2PO_4$).

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A tablet-based method for fabricating a suspension including gold (Au) particles and water can include adding to water a solid tablet prepared from an alkaline powder, an acid powder, and gold particles. Carbon dioxide ($CO_2$) gas can be generated once the tablet is added to the water. The gold (Au) particles can be in microparticle or nanoparticle form. The solid alkaline powder can include, for example, sodium bicarbonate ($NaHCO_3$) or sodium carbonate ($Na_2CO_3$). The solid acid powder can include, for example, monosodium phosphate ($NaH_2PO_4$). The gold (Au) particles can be homogenously dispersed in the water and maintained in a physically stable condition.

Although gold (Au) particles are described herein, it should be understood that other solid particles, e.g., other metals, oxides, or carbon-based materials, can be used instead to form the tablet. Preferably, the metal used is a noble metal. Similarly, a suitable base fluid other than water may alternatively be used in the suspension. Gold (Au) particles can be preferable in some applications because of their high resistance to water as well as acidic and alkaline environments. The method can be deemed as a one-step suspension fabrication approach since no mixing device is required to disperse the gold (Au) particles in the water. Preferably, the water has a pH of 7.

The tablet can be prepared by mixing the solid alkaline powder, the solid acid powder, and the Au particles, preferably using a ball or rod milling process. The balls or rods used to mix the solid powders in a ball or rod milling vial as well as an inner vial surface are preferably gold. This is because in a milling process, centrifugal forces can cause the ball or rod to not only mix the powder but also to collide into each other and onto the inner vial surface. This collision or impact can cause the outer surface of the balls/rods and the inner vial surface to erode. If the balls/rods or the inner vial surface made from a material that is different than the metal powder, the resulting mixed powder would contain undesired metallic residuals from the cracking of balls/rods and/or vial inner surface. The mixing duration can vary from short durations (e.g., 15 min) up to days. A mass ratio of the three solid powders can vary. In an embodiment, an acid powder: alkaline powder: Au particle mass ratio can be about 7:2:1, respectively.

A simulation investigation was performed using the simulation tool sold under the trademark ASPEN PLUS (version 9). The equilibrium composition of the tablets formed were calculated by minimizing the Gibbs free energy using a RGIBBS reactor. It was found that an inlet acid/base ratio ($NaH_2PO_4$ to $Na_2CO_3$ to Au particles) of 6.8:2:1 provided the highest $CO_2$ generation. Accordingly, in an embodiment, a mass ratio of $NaH_2PO_4$ to $Na_2CO_3$ to gold (Au) particles in the tablet can be 6.8:2:1, respectively.

Figure 1A:
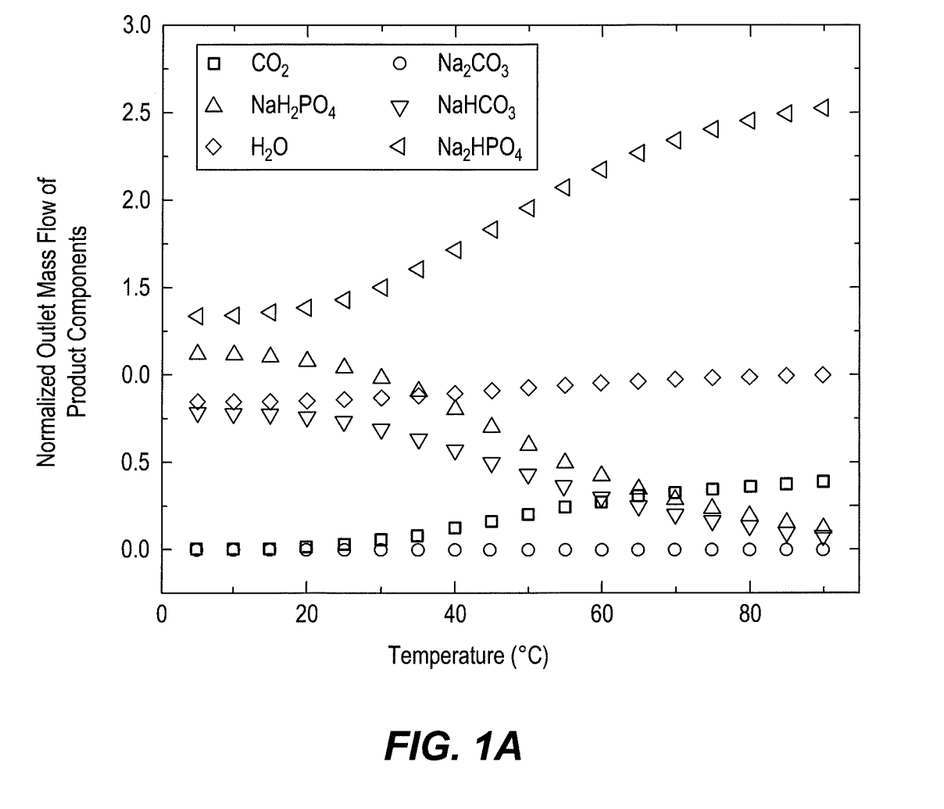
FIG. 1A is a graph showing the effect of reactor temperature on $CO_2$ generation.

In experiment, a sensitivity analysis was performed to study the effect of reactor temperature on the tablet composition and $CO_2$ generation. The results are presented in FIG. 1A. As shown in FIG. 1A, increasing the temperature at which the reaction takes place can lead to an increase in $CO_2$ generation due to the endothermic nature of reactions (Equation 1 and 2). Thus, raising the temperature can shift the reaction toward $CO_2$ formation. For example, raising the temperature of the base fluid can cause the reaction rate to increase. It should be noted, however, that increasing temperature too much may cause $CO_2$ bubbles to be rapidly released from the tablet, and hence the Au particles can have less mixing time within the base fluid. This can result in a lower suspension physical stability. Thus, the temperature of the base fluid, e.g., water, preferably ranges from about 20° C. to about 30° C.

Once the solid powders are mixed, the mixture is mechanically compressed into a tablet using a tablet press instrument, for example. In an embodiment, more than one type of mixture is formed using the solid powders. In an embodiment, a first mixture includes a mixture of the $NaH_2PO_4$ and $Na_2CO_3$ powders, a second mixture includes a mixture of the $NaH_2PO_4$, $Na_2CO_3$, and Au powders.

Figure 4:
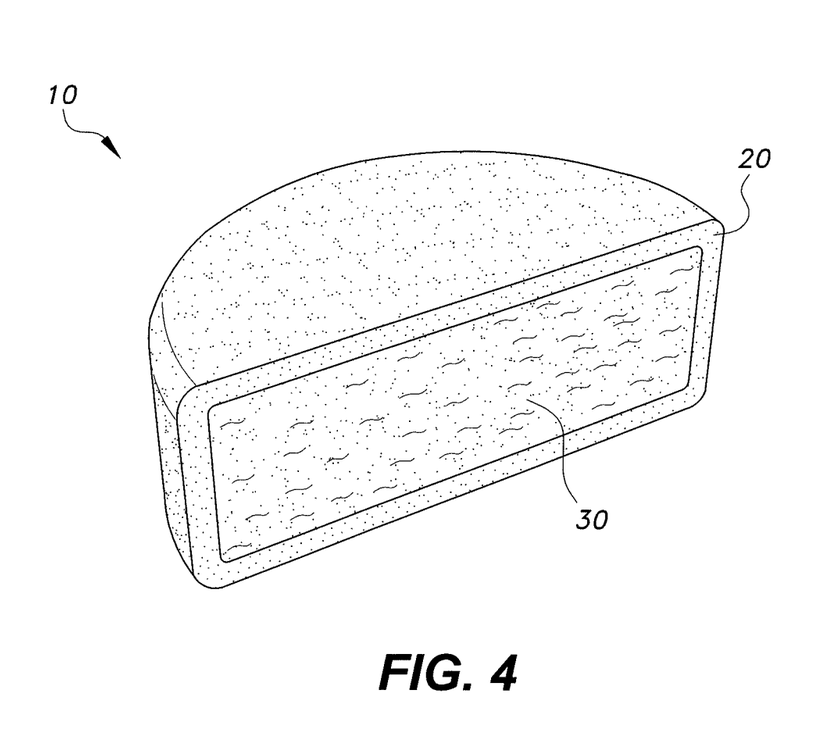
FIG. 4 shows a cross-section of a multi-layered tablet according to the present teachings.

As shown in FIG. 4, the tablet can be a multi-layered tablet 10 including one or more layers of the first mixture 20 and one or more layers of the second mixture 30. The multi-layered tablet 10 can provide enhanced dispersion of the gold (Au) particles in the host liquid when compared to a tablet formed homogenously of the second mixture. The multi-layered tablet can be prepared by placing a portion of the first mixture at the bottom of a tablet press cavity to form a tablet bottom layer, placing a cylinder on top of the first mixture layer (e.g., in a center thereof), adding a second portion of the first mixture between the die inner wall and the cylinder to form an outer central layer, placing the second mixture inside the cylinder to form an inner central layer, removing the cylinder, adding a remaining portion of the first mixture on top of the central layers to form an upper layer, and compressing the layers to form the multi-layered tablet. $CO_2$ bubbles produced by the first mixture upon contacting water can provide the necessary force to disperse the gold (Au) particles at the core of the tablet. It is believed that the arrangement of the mixture layers can generate sufficient $CO_2$ bubbles below the gold (Au) particles to facilitate homogeneous dispersion of the gold (Au) particles in the suspension.

Figure 5:
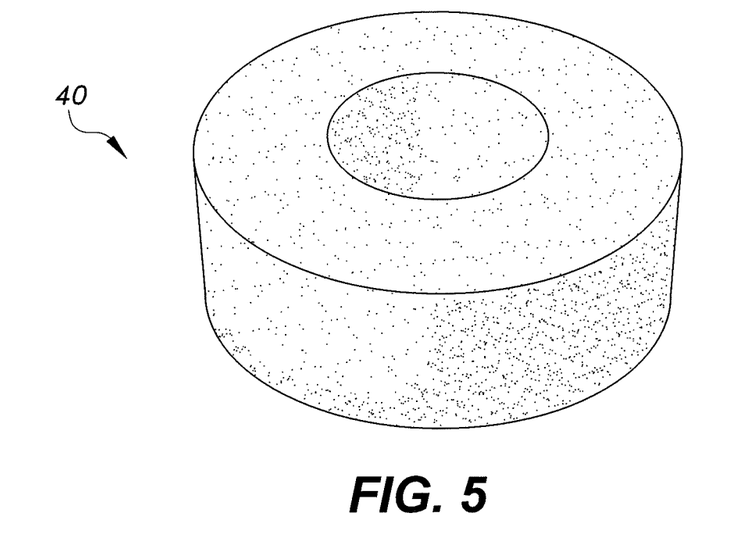
FIG. 5 shows a donut-shaped tablet according to the present teachings.
Figure 6:
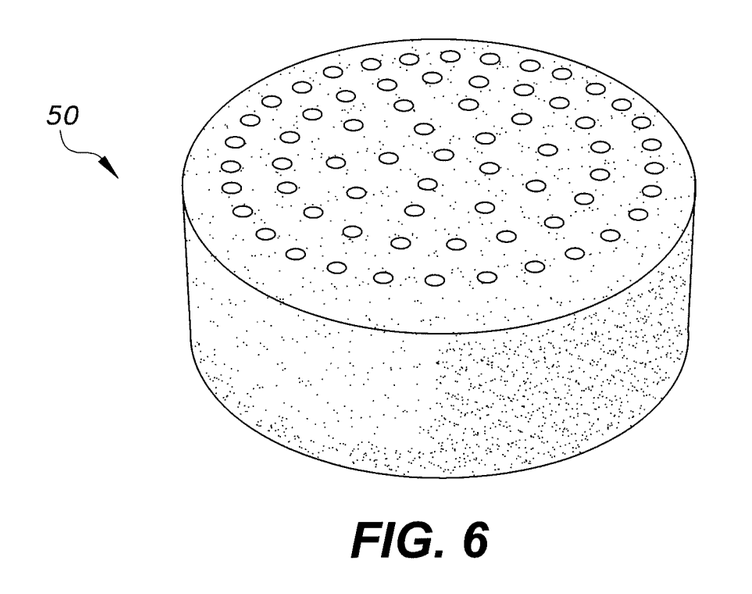
FIG. 6 shows a multi-holed tablet according to the present teachings.

In an embodiment, the tablet is a round, solid tablet. Alternatively, as shown in FIG. 5, the tablet can be a donut-shaped tablet 40. The tablet can be a multi-holed tablet 50, as shown in FIG. 6. Other tablet shapes can also be produced to improve the chemical reaction surface area by methods known in the art. For example, a puncher can be used in the compression process to define one or more holes in the tablet. The donut-shaped and multi-holed tablets can provide a larger surface area for the chemical reactions to occur. This can also facilitate dispersion of the gold (Au) particles.

The tablet can include one or more solid surfactant(s). A surfactant is particularly useful if the solid particles of the tablet are unstable in water. In an embodiment, the tablet includes a solid surfactant, solid gold (Au) particles, $NaH_2PO_4$, and $Na_2CO_3$.

In an embodiment, a method of forming a noble metal-water suspension can include adding the tablet to water. Once the tablet is in contact with the water, a chemical reaction takes place in which the metal particles are released from the tablet and dispersed into the water and $CO_2$ gas is released.

Figure 1B:
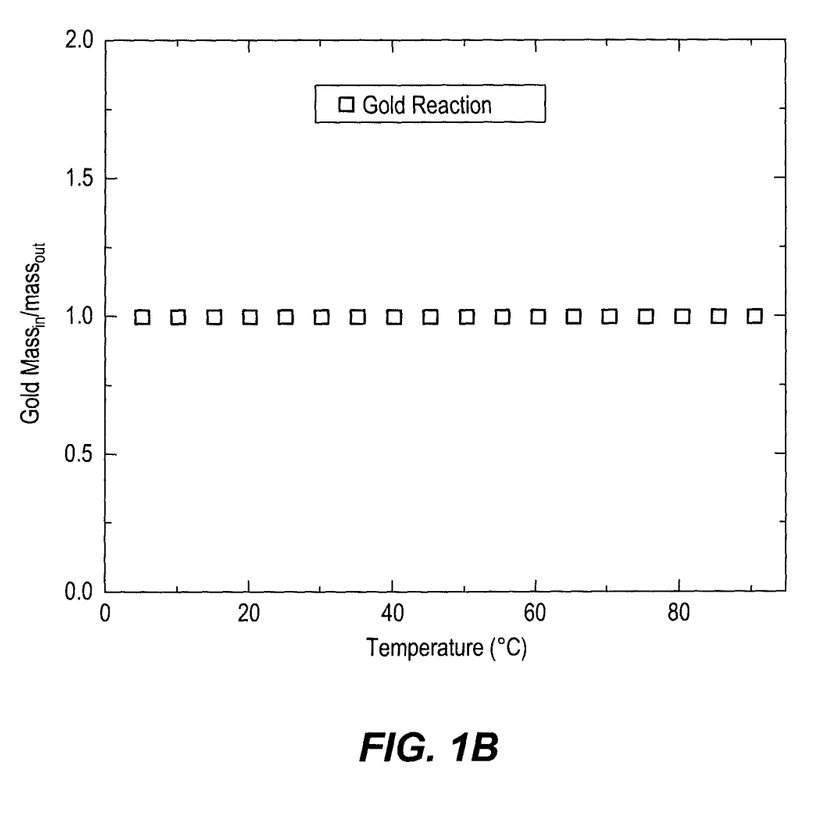
FIG. 1B is graph showing that gold is unreactive when the tablet is added to water.

In experiment, the reactivity of gold was determined through the introduction of a pure elemental gold stream to a reactor with the alkaline powder and the acid powder. It was observed that gold alone cannot participate in the reactions (Equation 1 and 2), even at elevated temperatures (FIG. 1B).

$$Na_2CO_3 + NaH_2PO_4 \rightarrow NaHCO_3 + Na_2HPO_4 \quad (1)$$

$$NaHCO_3 + NaH_2PO_4 \rightarrow CO_2 + H_2O + Na_2HPO_4 \quad (2).$$

Accordingly, it was found that elemental gold is a viable inert material for synthesizing the tablets.

Figure 2:
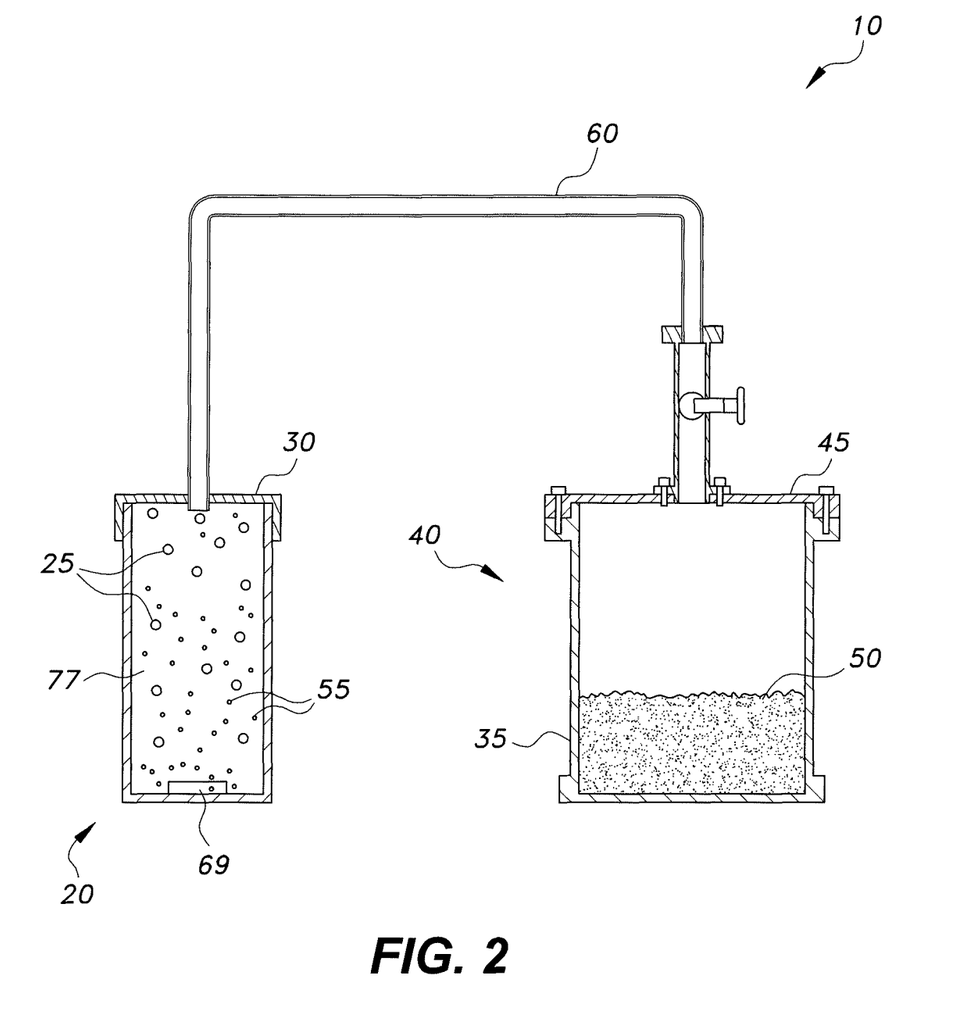
FIG. 2 is a diagram illustrating the process of suspension formation and $CO_2$ generation and storage.

As shown in FIG. 2, the method can include using a $CO_2$-capturing assembly 10 to capture the $CO_2$ released from the reaction. In an embodiment, the $CO_2$-capturing assembly 10 includes a first vial 20 for storing water, a first cap 30 configured for removably sealing an opening of the first vial 20, a second vial 40 for storing zeolite 50, a second cap 45 configured for removably sealing an opening in the second vial 40, and a tube 60 configured to extend through openings of the first cap 30 and the second cap 45. Water 77 can be provided in the first vial 20 and zeolite 50 can be provided in the second vial 40.

Once the tablet 69 is added to the water 77 in the first vial 20, the alkaline and acid chemicals forming the tablet 69 react with the water 77. The resulting chemical reaction between the tablet 69 and water 77 can cause the tablet 69 to gradually dissolve, generating $CO_2$ gas 25 (in the form bubbles), and releasing metal particles 55. The buoyancy force of the bubbles 25 can then cause the metal particles 55 to disperse within the water 77, and thus produce the metal-water suspension. In addition, the generated $CO_2$ gas can travel from the first vial 20 to the second vial 40 through the tube 60 and be adsorbed by the zeolite powder 50 in the second vial 40. The zeolite powder 50 can adsorb all of the $CO_2$ gas generated from the reaction in the first vial. The adsorbed $CO_2$ gas 25 can later be regenerated (or extracted) for later usage by heating or depressurizing the zeolite vial. Once all of the $CO_2$ bubbles 25 have left the suspension, the vial 40 containing the zeolite powder 50 can be sealed by closing the connection valve or tube 60. As a result of the reaction in the first vial 20, two final products are obtained, namely: 1) the metal-water suspension; and 2) stored $CO_2$ gas. The captured $CO_2$ can be used in many applications, such as fire extinguishers, manufacture of casting molds to enhance their hardness, carbonated soft drinks, and as an inert gas for chemical processes.

In an embodiment, more than one tablet can be added to the water. Increasing the number of tablets can cause the volumetric concentration of metal particles to increase in the suspension. In an embodiment, the temperature of water can range from about 20° C. to about 30° C. The temperature of the base fluid (i.e., water) can affect the rate of the chemical reaction between the tablet and the base fluid. For example, raising the temperature of the base fluid can cause the reaction rate to increase. This can also result in $CO_2$ bubbles being rapidly released from the tablet, allowing the metal particles less mixing time within the base fluid. Thus, excessive temperatures can result in a lower physical stability of the suspension.

Using a base fluid of pH 7 is preferred. A base fluid of higher or lower pH values (i.e., >or <than 7) to fabricate the suspension is also possible but may require a change in the $NaH_2PO_4$:$Na_2CO_3$:Au mass ratios.

The physical stability of the suspension has a major influence on the thermophysical properties of the liquid-solid mixture. Optimum thermo-physical properties can only be obtained when the dispersed particles are physically stable, and vice versa.

The present method of fabricating a suspension can be used in industrial applications, such as liquid cold computers, parabolic trough solar collectors, solar bath heaters, intercoolers, nuclear reactors (for energy purposes and/or lose of coolant accidents), and any other application that uses heat transfer fluids. The present method of producing a suspension by adding a tablet to water obviates the need for using mixing devices or sophisticated equipment conventionally used to prepare suspensions. As such, suspensions can be produced in remote areas without the need for electrical sources to run the mixing devices. Further, suspensions can easily be prepared as needed rather than stored. The tablets can be stored in sealed bags or containers (similar to any solid chemicals) and used as desired. The tablets can enhance the heat transfer capability of water because the dispersed Au particles can cause the effective thermal conductivity of the mixture to rise.

Figure 3:
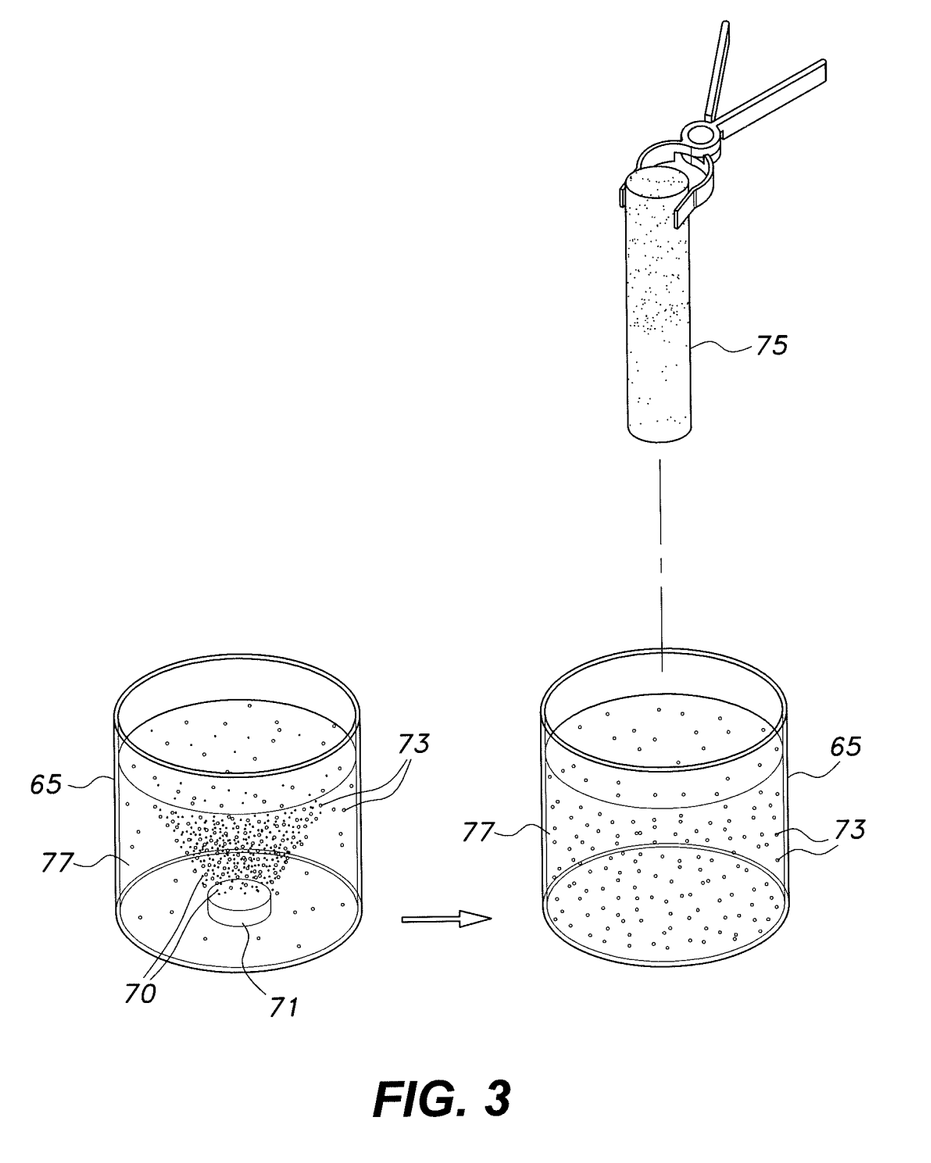
FIG. 3 is a diagram illustrating the process of metal quenching and coating using the process of suspension formation described herein.

In an embodiment, the method for fabricating a suspension described herein can be used for quenching and coating metals. As shown in FIG. 3, the solid tablet 71 prepared from an alkaline powder, an acid powder, and gold particles can be immersed in a base liquid, such as water 77. The alkaline powder and the acid powder can react in the water to form $CO_2$ gas 73 which causes the water 77 to carbonate and disperses the gold particles 70 in the water 77, forming a carbonated water-gold suspension quencher that can be used for metallic quenching and coating applications. Immersing a metal or metal part 75 in the water-gold suspension quencher can reduce the possibility of geometrical expansion to the quenched part while providing a gold thin film on the immersed metal surface.

Using carbonated water as a quenchant helps in reducing the geometrical expansion of the final product. This is because the carbon dioxide ($CO_2$) bubbles within the water media reduces the formation of the air pockets on the quenched metal exposed surface, and hence an even heat transfer between the metal and the surrounding liquid can be achieved. Furthermore, when it comes to quenching metals in suspensions, the hot metallic surface will attract the dispersed particles from the host liquid and, thereby, form a permanent attached thin film layer.

Synthesis of the carbonated water-gold (Au) suspension quenchant only requires adding the pre-prepared solid tablet to water. The resulting chemical reaction between the effervescent tablet and water can cause the tablet to gradually dissolve. As the dissolving process takes place, $CO_2$ gas (in the form of bubbles) can start to generate and the Au particles can be released from the tablet. The buoyancy force of the bubbles can then cause the Au particles to disperse within the hosting liquid, thus producing the Au-water suspension. Once the tablet is fully dissolved, the high temperature metal is quenched in the suspension to cool it down. At this stage, the $CO_2$ bubbles can provide an even heat transfer mechanism along the quenched part from the coolant media and, thereby, highly reduce the possibility of uneven expansion to the final product that is usually experienced by conventional water. Moreover, at the quenching phase, the hot metal can attract the dispersed particles to its surface to form a thin coating layer of gold (Au). The adhesion of the thin layer can be high, which means that the thin film can be highly attached to the surface due to the thermally formed bond between the particles and the hot metallic exposed surface. This can also result in the coated layer having a smooth surface finish (i.e., of low surface roughness), which is the case with most thermal coating approaches. The remaining Au particles in the quenchant have high resistance to water, acidic, and alkaline environments and can be easily regained after quenching through centrifugation of the used suspension quenchant. As such, no gold (Au) particles will be lost from the quenching and coating method described.

It should be understood that increasing the number of tablets can cause the volumetric concentration of gold (Au) particles to increase in the suspension and that raising the temperature of the base fluid can cause the reaction rate to increase. In order to provide sufficient time for the gold (Au) particles to mix with the base fluid, however, the temperature of the base fluid, e.g., water, preferably ranges from about 20° C. to about 30° C. The pH value of the base fluid is preferably pH 7. Using a base fluid (i.e., water) of higher or lower pH values (i.e., >or <than 7) to fabricate the suspension is possible but would require a change in the $NaH_2PO_4:Na_2CO_3:Au$ mass ratios to maintain the desired chemical reaction. Use of the tablets to form the suspensions described herein can enhance the heat transfer capability of water and even the heat transfer along the quenched metal. This is because the dispersed Au particles can cause the effective thermal conductivity of the mixture to rise, and the $CO_2$ bubbles can break the formation of air pockets at the quenched metal surface.

It is to be understood that the method for fabricating a suspension including gold particles is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tablet-based method for fabricating a suspension, comprising:
   providing water in a container;
   providing a tablet comprising a solid alkaline, a solid acid, and noble metal particles, the noble metal particles being selected from the group consisting of microparticles and nanoparticles; and
   adding the tablet to the water to produce a reaction in the water resulting in the release of $CO_2$ gas, the $CO_2$ gas dispersing the noble metal particles in the water to provide the suspension,
   wherein the noble metal particles are gold nanoparticles.

2. The method for fabricating a suspension as recited in claim 1, wherein the tablet includes at least one hole defined therethrough.

3. The method for fabricating a suspension as recited in claim 1, wherein the solid alkaline is selected from the group consisting of sodium bicarbonate ($NaHCO_3$) powder and sodium carbonate ($Na_2CO_3$) powder.

4. The method for fabricating a suspension as recited in claim 1, wherein the solid acid comprises monosodium phosphate ($NaH_2PO_4$) powder.

5. The method for fabricating a suspension as recited in claim 1, wherein the tablet is formed by:
   mixing an acid powder and an alkaline powder to form a first mixture;
   mixing an acid powder, an alkaline powder, and a noble metal powder to form a second mixture;
   providing a tablet press with a die for compressing the powders into a tablet;
   forming a tablet bottom layer by disposing a first portion of the first mixture at the bottom of the die cavity;
   forming a tablet central layer by disposing the second mixture on top of an inner portion of the tablet bottom layer and disposing a second portion of the first mixture on top of the tablet bottom layer surrounding the second mixture;
   forming a tablet top layer by disposing a third portion of the first mixture over the tablet central layer; and
   compressing the bottom, central, and top tablet layers using the tablet press to form the tablet.

6. The method for fabricating a suspension as recited in claim 5, wherein the alkaline powder is selected from the group consisting of sodium bicarbonate ($NaHCO_3$) powder and sodium carbonate ($Na_2CO_3$) powder.

7. The method for fabricating a suspension as recited in claim 6, wherein the acid powder is monosodium phosphate ($NaH_2PO_4$) powder.

8. The method for fabricating a suspension as recited in claim 7, wherein the tablet comprises a mass ratio of $NaH_2PO_4$ to $Na_2CO_3$ to gold (Au) nanoparticles of 6.8:2:1.

9. A method for fabricating a suspension, comprising the steps of:
   providing water in a first container;
   providing a tablet comprising a solid alkaline, a solid acid, and gold particles, the gold particles being selected from the group consisting of microparticles and nanoparticles; and
   adding the tablet to the water to produce a reaction in the water resulting in the release of $CO_2$ gas, the $CO_2$ gas dispersing the gold particles in the water.

10. The method as recited in claim 9, further comprising:
    providing zeolite powder in a second container;
    channeling the $CO_2$ produced in the first container to the second container; and
    adsorbing the $CO_2$ gas by the zeolite powder.

11. The method as recited in claim 9, wherein the tablet comprises at least one hole defined therethrough.

12. The method as recited in claim 9, wherein the solid alkaline is selected from the group consisting of sodium bicarbonate ($NaHCO_3$) powder and sodium carbonate ($Na_2CO_3$) powder.

13. The method as recited in claim 9, wherein the solid acid comprises monosodium phosphate ($NaH_2PO_4$) powder.

14. A method for fabricating a suspension and capturing $CO_2$ gas, comprising the steps of:
    providing water in a first container;
    providing a tablet comprising a solid alkaline, a solid acid, and gold particles, the gold particles being selected from the group consisting of microparticles and nanoparticles;
    adding the tablet to the water to produce a reaction in the water resulting in the release of $CO_2$ gas, the $CO_2$ gas dispersing the gold particles in the water;
    providing zeolite powder in a second container;
    channeling the $CO_2$ gas produced in the first container to the second container; and
    adsorbing the $CO_2$ gas by the zeolite powder.

15. The method as recited in claim 14, wherein:
    the solid alkaline is selected from the group consisting of sodium bicarbonate ($NaHCO_3$) powder and sodium carbonate ($Na_2CO_3$) powder; and
    the solid acid comprises monosodium phosphate ($NaH_2PO_4$) powder.

16. A method for fabricating a suspension, comprising:
providing water in a container;
providing a tablet comprising a solid alkaline, a solid acid, and gold (Au) particles, the gold (Au) particles being selected from the group consisting of microparticles and nanoparticles;
adding the tablet to the water to produce a reaction resulting in the release of $CO_2$ gas, the $CO_2$ gas dispersing the gold particles in the water to provide a suspension; and
immersing a hot metal that has a temperature below its melting point in the suspension to provide a quenched metal coated with the gold particles.

\* \* \* \* \*